(12) United States Patent
He (10) Patent No.: US 8,204,129 B2
(45) Date of Patent: Jun. 19, 2012

(54) SIMPLIFIED DEBLOCK FILTERING FOR REDUCED MEMORY ACCESS AND COMPUTATIONAL COMPLEXITY

(75) Inventor: Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1484 days.

(21) Appl. No.: 11/691,911

(22) Filed: Mar. 27, 2007

(65) Prior Publication Data

US 2008/0240252 A1 Oct. 2, 2008

(51) Int. Cl.
*H04N 7/12* (2006.01)
(52) U.S. Cl. ............... 375/240.24; 375/240.29
(58) Field of Classification Search .......... 375/240.12, 375/240.24, 240.29
See application file for complete search history.

(56) References Cited

U.S. PATENT DOCUMENTS

| | | | | |
|---|---|---|---|---|
| 7,167,522 | B2 * | 1/2007 | Webb | 375/240.29 |
| 7,283,588 | B2 * | 10/2007 | Bjontegaard | 375/240.01 |
| 7,430,336 | B2 * | 9/2008 | Raveendran | 382/268 |
| 7,457,362 | B2 * | 11/2008 | Sankaran | 375/240.24 |
| 7,929,610 | B2 * | 4/2011 | Sun | 375/240.16 |
| 8,116,376 | B2 * | 2/2012 | Boyce et al. | |
| 2006/0250653 | A1 * | 11/2006 | Joch et al. | 358/3.26 |
| 2006/0268985 | A1 * | 11/2006 | Liang et al. | 375/240.16 |
| 2007/0025448 | A1 * | 2/2007 | Cha et al. | 375/240.24 |
| 2007/0160129 | A1 * | 7/2007 | Fujisawa et al. | 375/240 |
| 2008/0199090 | A1 * | 8/2008 | Tasaka et al. | 382/233 |

OTHER PUBLICATIONS

Arild Fuldseth and Thomas Wiegand, Draft new Annex B/H.241 "Reduced-Complexity Decoding Operation (RCDO) for H.264 Baseline Profile Bitstreams"Geneva, Apr. 3-13, 2006.
Peter List, Anthony Joch, Jani Lainema, Gisle Bjontegaard, and Marta Karczewicz, "Adaptive Deblocking Filter" IEEE Transactions on Circuits and Systems for Video Technology, vol. 13, No. 7, Jul. 2003.
International Search Report and Written Opinion for correlating PCT Patent Application No. PCT/US2008/054244 dated Jul. 14, 2008.

* cited by examiner

*Primary Examiner* — Eleni Shiferaw
*Assistant Examiner* — Phy Anh Vu
(74) *Attorney, Agent, or Firm* — Gary Stanford (57) ABSTRACT

A method of simplifying deblock filtering of video blocks of an enhanced layer of scalable video information is disclosed which includes selecting an adjacent pair of video blocks, determining whether boundary strength of the video blocks is a first value, evaluating first conditions using component values of a first component line if the boundary strength is not the first value, and bypassing deblock filtering between the video blocks if the boundary strength is the first value or if any of the first conditions is false. The method may include bypassing evaluating conditions and deblock filtering associated with the maximum boundary strength. The method may include bypassing evaluating second conditions and bypassing corresponding deblock filtering if the intermediate edge is a horizontal edge. The method may include bypassing less efficient memory reads associated with component values used for evaluating the second conditions.

20 Claims, 4 Drawing Sheets

FIG. 6

SIMPLIFIED DEBLOCK FILTERING FOR REDUCED MEMORY ACCESS AND COMPUTATIONAL COMPLEXITY

BACKGROUND OF THE INVENTION

1. Field of the Invention

The present invention relates in general to video information processing, and more specifically to simplifying deblock filtering of video blocks to reduce memory access and to reduce computational complexity.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock (MB) level, where each MB is a 16×16 block of pixel values. Each MB is encoded in "intra" mode in which a prediction MB is formed based on reconstructed MBs in the current frame, or "inter" mode in which a prediction MB is formed based on reference MBs from one or more reference frames. The intra coding mode applies spatial information within the current frame in which the prediction MB is formed from samples in the current frame that have previously encoded, decoded and reconstructed. The inter coding mode utilizes temporal information from previous and/or future reference frames to estimate motion to form the prediction MB. The video information is typically processed and transmitted in slices, in which each video slice incorporates one or more macroblocks.

Scalable Video Coding (SVC) is an extension of the H.264 standard which addresses coding schemes for reliable delivery of video to diverse clients over heterogeneous networks using available system resources, particularly in scenarios where the downstream client capabilities, system resources, and network conditions are not known in advance, or dynamically changing from time to time. SVC provides multiple levels or layers of scalability including temporal scalability, spatial scalability, complexity scalability and quality scalability. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. Complexity scalability generally refers to the various computational capabilities and processing power of the devices processing the video information. Quality scalability generally refers to the visual quality layers of the coded video by using different bitrates. Objectively, visual quality is measured with a peak signal-to-noise (PSNR) metric defining the relative quality of a reconstructed image compared with an original image.

A deblocking filter is a formative part of the H.264 standard and SVC extension, and an informative part (as a post processing block) of the earlier H.263 standard and MPEG4-Part2. The deblocking filter performs both luminance ("luma") and chrominance ("chroma") filtering as known by those of ordinary skill in the art. The deblocking filter is used either as an in-loop filter as part of the standard (e.g., H.264/AVC), or as a post-processor for video decoder (e.g., H.263, MPEG4-part2, MPEG-2, etc.). The deblocking filter enhances the decoded picture quality and increases the encoding efficiency by removing the block effects in the boundary of each 4×4, 8×8, and/or 16×16 block. The deblocking filter, however, also consumes a significant amount of power and processing cycles. Generally speaking, the entire deblocking filter (for both luma and chroma) consumes approximately 8% of the computations at the encoder and approximately 35% at the decoder for H.264/AVC. The considerable computation consumption for deblock filtering becomes worse in SVC configurations because deblocking is performed for both base and enhanced layers and additional deblock filtering is performed for interlayer prediction.

The joint video team (JVT) has considered a simplified deblocking filter for the enhanced layer of SVC without modification of deblock filtering at the base layer. The JVT includes experts from the Video Coding Expert Group (VCEG) of the International Telecommunication Union (ITU) and the MPEG of the international standards organization (ISO). One proposal is to use the H.241 RCDO (Reduced Complexity Decoder Operation) deblocking filter for the SVC enhanced layer(s). The RCDO deblocking filter solution, however, results in a noticeable visual quality degradation and further results in a higher design cost because it uses a different data flow and different computation logic as compared to the H.264 deblocking filter.

It is desired to reduce the computational complexity and amount of memory access of H.264 deblock filtering without increasing design cost and without causing significant visual quality degradation.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments of the present invention. It is intended, however, that the present disclosure apply more generally to any of various types of "video information" including video sequences (e.g. MPEG), image information, or image sequencing information, such as, for example, JPEG (Joint Photographic Experts Group), motion JPEG (MJPEG), JPEG2000, motion JPEG2000 (MJPEG2000), etc. The term "video information" as used herein is intended to apply to any video or image or image sequence information.

Figure 1:
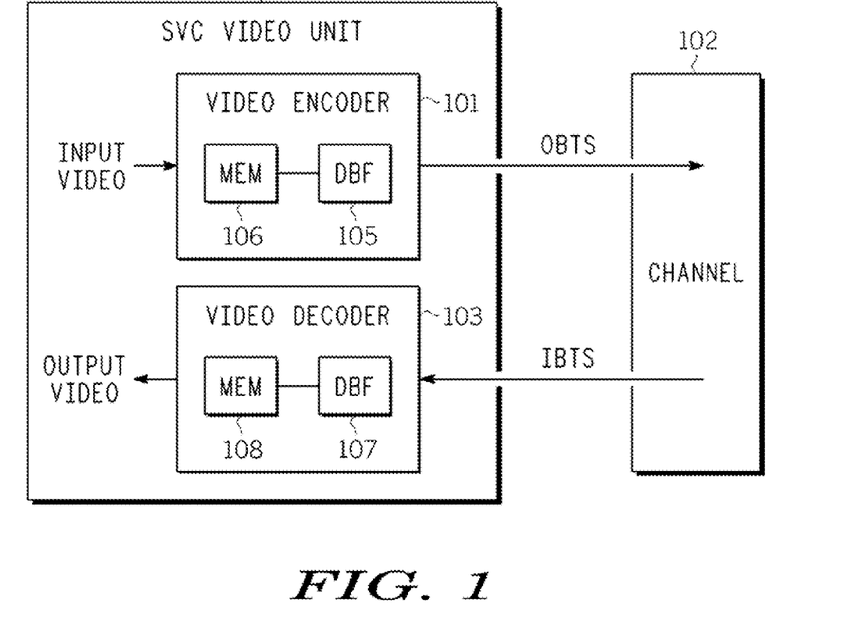
FIG. 1 is a simplified block diagram of an SVC video system implemented according to an exemplary embodiment including both an SVC video encoder and decoder.

FIG. 1 is a simplified block diagram of an SVC video system 100 implemented according to an exemplary embodiment. The SVC video system 100 includes an SVC video encoder 101 and an SVC video decoder 103 incorporated within a common system unit. A unit incorporating only the encoder 101 or the decoder 103 is contemplated as well. The video encoder 101 encodes input video and encapsulates the encoded video information into an output bitstream (OBTS) asserted onto a channel 102. An input BTS (IBTS) is provided via the channel 102 to the video decoder 103, which provides output video. The channel 102 may be any media or medium including wireless communications. The video encoder 101 includes coding and decoding components and functions, including motion estimation which determines coded residuals including a block motion difference for the inter coding mode. During motion estimation, a block motion difference is determined between a current MB in a current frame and a reference MB in a reference frame. Also during motion estimation, a motion vector (MV) value is determined as a relative distance between positions of the current MB and the reference MB. The SVC video system 100 further supports various layers of scalability, including temporal scalability, spatial scalability, complexity scalability and quality scalability. As previously described, temporal scalability generally refers to the number of frames per second (fps) of the video stream, such as 7.5 fps, 15 fps, 30 fps, etc. Spatial scalability refers to the resolution of each frame, such as CIF (352 by 288 pixels per frame), or QCIF (176 by 144 pixels per frame), although other spatial resolutions are contemplated, such as 4CIF, QVGA, VGA, SVGA, D1, HDTV, etc. Complexity scalability generally refers to the various computational capabilities and processing power of the devices processing the video information. Quality scalability generally refers to the visual quality layers of the coded video by using different bitrates. Objectively, visual quality is measured with the PSNR metric defining the relative quality of a reconstructed image compared with an original image.

As understood by those skilled in the art, the SVC video system 100 uses a selected transform function, such as the discrete cosine transform (DCT) algorithm or the like, and provides transform coefficients to a quantization circuit. The transform coefficients are scaled to integers and quantized into quantized transform coefficients signal by a quantization circuit, where the quantization step size is controlled by a quantization parameter (QP). The quantized transform coefficients scanned and then entropy coded. Entropy coding is according to any suitable type of entropy encoding such as Universal Variable Length Codes ("UVLC"), Context Adaptive Variable Length Codes ("CAVLC"), Context-based Adaptive Binary Arithmetic Coding ("CABAC"), or combinations thereof, or any other type of entropy encoding as known to those skilled in the art. The entropy coded information is provided to a data buffer for transmission. Quality scalability is achieved by adjusting the QP, by selection of the entropy coding method, and/or by progressively entropy coding the bit-plane, to adjust the bitrate of the output bitstream OBTS. The SVC video system 100 further includes interpolator and filtering functions as known to those skilled in the art to support multiple spatial layers to achieve spatial scalability.

The video encoder 101 includes a memory 106 coupled to a deblocking filter (DBF) 105 and the video decoder 103 includes a memory 108 coupled to a similar deblocking filter 107. The deblocking filters 105 and 107 filter reconstructed frame information stored in the respective memories 106 and 108. The deblocking filters 105 and 107 and their respective components operate in substantially the same manner to filter reconstructed frame information in substantially the same manner to maintain uniformity between the input and output video information as understood by those of ordinary skill in the art.

Figure 2:
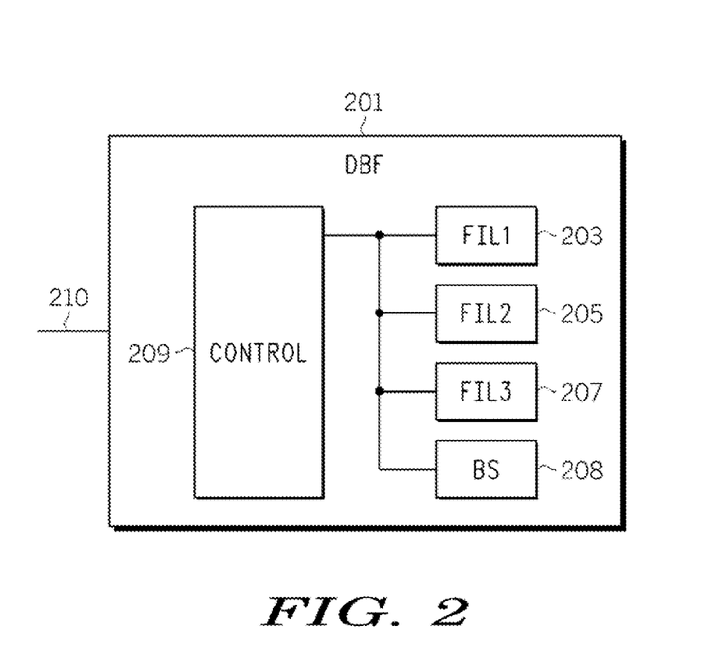
FIG. 2 is a simplified block diagram of a deblocking filter used as the deblocking filter for either or both of the deblocking filters of the video encoder and the video decoder of FIG. 1.

FIG. 2 is a simplified block diagram of an exemplary deblocking filter 201, which may be used as either or both of the deblocking filters 105 and 107. In the illustrated embodiment, the deblocking filter 201 includes multiple filters including a first filter (FIL1) 203, a second filter (FIL2) 205, and a set of third filters (FIL3) 207. Although the filters FIL1 203 and FIL2 205 are each described as a "filter" implying a single filter, each may include any number of filters as known to those skilled in the art. The deblocking filter 201 further includes a boundary strength (BS) circuit 208 coupled to a control circuit 209, which controls operation including use of the filters 203, 205 and 207. A memory interface 210 is provided for accessing the applicable memory, such as either memory 106 or 108. As further described below, the use of the first filter FIL1 203 is based on a boundary strength (BS) value and a first set of conditions, the use of the second filter FIL2 205 is based on the BS value and a second set of conditions, and the use of the third filters FIL3 207 is based on the BS value and a third set of conditions, where the BS value is determined by the BS circuit 208.

Figure 3:
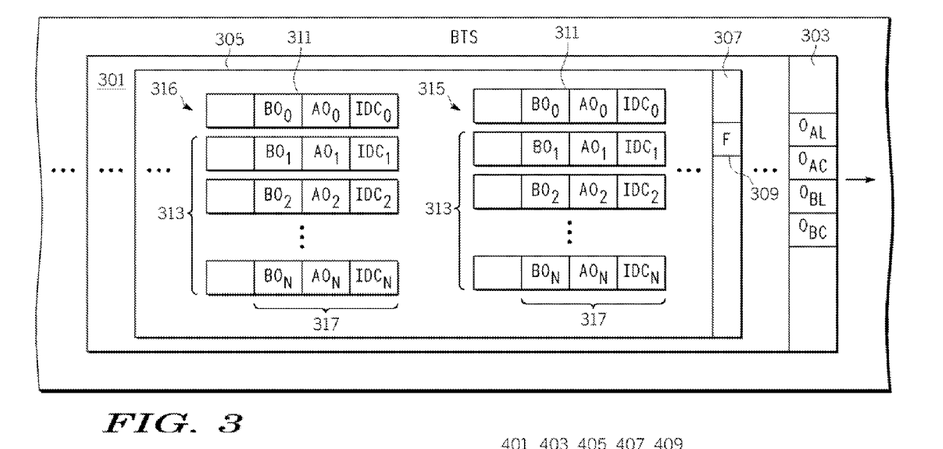
FIG. 3 is a block diagram depicting video and deblocking filter control information provided in a bitstream BTS according to an exemplary embodiment.

FIG. 3 is a block diagram depicting video and deblocking filter control information provided in a bitstream BTS according to an exemplary embodiment, which represents information incorporated into the output bitstream (e.g., OBTS) by the video encoder 101, or information received from the input bitstream BTS (e.g., the IBTS) to the video decoder 103. The bitstream BTS includes at least one video information sequence 301, which includes a sequence header 303 incorporating and describing the parameters used for the entire video sequence 301, such as, for example, a coding profile, a coding level, a picture width, a picture height, etc. In SVC configurations, scalability information is also included. Each sequence typically has only one sequence header. In one embodiment, the sequence header 303 is modified to include an alpha offset for luma information $O_{AL}$, an alpha offset for chroma information $O_{AC}$, a beta offset for luma information $O_{BL}$, and a beta offset for chroma information $O_{BC}$. These additional offsets are used to further adjust the conditions for deblock filtering, as further described below. The video information sequence 301 further includes one or more video frames (or pictures) including an exemplary video frame 305 as illustrated. Each frame includes a frame header describing the parameters used for the entire video frame, such as entropy coding mode flag, slice group map type, an initial QP value, chroma QP index offset, a deblocking filter control present flag, etc. The video frame 305, for example, includes a frame header 307 at the front of the video frame 305 which further includes a deblocking filter control present flag 309, labeled "F".

Each video frame in the video information sequence 301, including the video frame 305, includes one or more slices, in which each slice incorporates one or more macroblocks for the frame. In a scalability configuration, each frame includes multiple layers including a base layer and one or more enhanced layers, where each slice is either a base layer slice or an enhanced layer slice. As shown, the video frame 305 includes multiple slices including base layer slices 311 and enhanced layer slices 313. The slices of the video frame 305 are shown in groups including a first group of slices 315 and a second group of slices 316, etc. Each of the illustrated groups of slices 315 and 316 includes a slice for each layer, including a base layer slice and an enhanced layer slice for each enhanced layer included in the frame. The illustrated groups of slices are not intended to described how the slices are actually organized within the bitstream BTS during transmission but only to illustrate corresponding or associated slices within each video frame for purposes of deblocking parameter determinations. During transmission, the slices may be grouped or combined in any one of several different manners. For example, the base layer slices may be transmitted first followed by first enhanced layer slices which are followed by second enhanced layer slices and so on.

Each slice includes a slice header 317 which describes the parameters used for that video coding slice. Each slice header 317 includes the first macroblock position in the slice, the corresponding frame number, a delta QP parameter for the slice, one or more parameters for deblocking filter control, etc. Each slice header 317 includes deblocking filter control parameters, which may include a disable_deblocking_filter_idc parameter (or IDC) for that slice. As shown, the slice headers 317 include a first deblocking disable control parameter $IDC_0$ for each base layer slice, a second deblocking disable control parameter $IDC_1$ for each first enhanced layer slice, a third deblocking disable control parameter $IDC_2$ for each second enhanced layer slice, and so on up to a final deblocking disable control parameter $IDC_N$ for each last enhanced layer slice (for layers 0 to N for N+1 slice layers). Most practicable configurations only include one or two enhanced layers although N+1 layers are shown to illustrate that any number of layers are possible depending upon the particular implementation.

In one embodiment, each of the IDC deblocking disable control parameters has a value of "1" to disable deblock filtering for the corresponding layer and a value of "0" to enable deblock filtering for that layer. Additional values (e.g., 2, 3 and 4) may be defined for more complex configurations. The IDC deblocking disable control parameters are optionally presented with each slice header depending upon the state of the deblocking filter control present flag 309 in the frame header. If the deblocking filter control present flag 309 in the frame header 307 of the video frame 305 has a value of "0", then the IDC deblocking disable control parameters (e.g., $IDC_0, IDC_1, IDC_2, \ldots, IDC_N$) are not presented in the slice headers 317 of any of the slices. Instead, all of the IDC deblocking disable control parameters are assumed to have a default value of "0" to enable deblock filtering for each layer. If the deblocking filter control present flag 309 in the frame header 307 of the video frame 305 has a value of "1", then the IDC deblocking disable control parameters are presented in the slice headers 317 of each of the slices, so that each IDC deblocking disable control parameter is examined to determine whether to enable or disable deblock filtering for the corresponding layer.

The syntax includes deblock filtering parameters at the slice level as understood by those skilled in the art. The IDC deblocking disable control parameter is used to enable or disable the deblocking filter for a given slice layer, having a default value of "0" for enable and "1" for disable. A slice_alpha_c0_offset_div2 parameter is used to adjust an "alpha" value for filtering. The default value for this parameter is "0". The alpha offset parameters are shown in the slice headers as $AO_0, AO_1, AO_2, \ldots, AO_N$ for the N+1 slices of each slice group. The nonzero alpha offset in the range of [−6, +6] provides the encoder designer with the ability to optimize the subjective quality of the decoded video beyond that provided by use of the default information. For example, reducing the amount of filtering by transmitting negative offset can help to maintain the sharpness of small spatial details, particularly with high-resolution video content, in which small blocking artifacts tend to be less apparent. On the other hand, using positive offsets to increase the amount of filtering can improve subjective quality on content where visible blocking artifacts remain if the default values are used. This is beneficial for lower resolution content with smooth brightness transitions and to remove additional artifacts that might be introduced by sub-optimal motion estimation, mode decision, or residual coding. A slice_beta_offset_div2 parameter is used to adjust a "beta" the value for filtering in a substantially similar manner as the alpha value described above. Again, the default value for beta is "0". The beta offset parameters are shown in the slice headers as $BO_0, BO_1, BO_2, \ldots, BO_N$ for the N+1 slices of each slice group.

The video and deblocking filter control information illustrated in the bitstream BTS of FIG. 3 is exemplary and many variations are possible and contemplated. For example, in one alternative embodiment, the bitstream BTS remains unmodified so that the alpha and beta offset information $O_{AL}$, $O_{AC}$, $O_{BL}$, and $O_{BC}$ are not included. In another alternative embodiment, the alpha and beta offset information $O_{AL}$, $O_{AC}$, $O_{BL}$, and $O_{BC}$ are provided within each frame header 307 rather than within the sequence header to adjust deblock filtering for each frame. In yet another alternative embodiment, the alpha and beta offset information $O_{AL}$, $O_{AC}$, $O_{BL}$, and $O_{BC}$ are provided within each slice header 317, so that deblock filtering may be adjusted for the one or more macroblocks of information within each slice. It is appreciated, however, that the additional alpha and beta offset information $O_{AL}$, $O_{AC}$, $O_{BL}$, and $O_{BC}$ add bits in the bitstream BTS, particularly at the slice- or frame-level.

Figure 4:
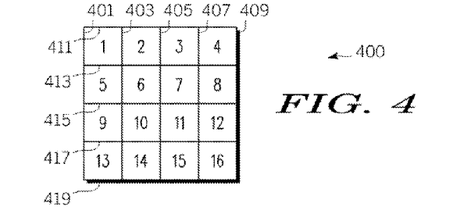
FIG. 4 is a block diagram of an exemplary macroblock illustrating the vertical edge and horizontal edge deblock filtering process for each 4×4 block of each 16×16 macroblock.

FIG. 4 is a block diagram of an exemplary macroblock 400 illustrating the vertical edge and horizontal edge deblock filtering process for each 4×4 block of each 16×16 macroblock. Each macroblock includes 16 rows of 16 pixel values each row, where each pixel value includes luma components (Y) and chroma components (Cb and Cr). The square macroblock 400 is shown equally subdivided into 16 4×4 square blocks labeled 1-16. The macroblock 400 is shown with a left vertical edge 401 separating it from a macroblock immediately to its left (if any, or otherwise along the left edge of the frame), and a right vertical edge 409 separating it from a macroblock immediately to its right (if any, or otherwise along the right edge of the frame). The macroblock 400 is also shown with three intermediate vertical edges 403, 405 and 407 subdividing the macroblock into 4 columns of 4 4×4 blocks each column. The macroblock 400 is further shown with a top horizontal edge 411 separating it from a macroblock immediately above it (if any, or otherwise along the upper edge of the frame), and a lower horizontal edge 419 separating it from a macroblock immediately below it (if any, or otherwise along the lower edge of the frame). The macroblock 400 is further shown with three intermediate horizontal edges 413, 415 and 417 subdividing the macroblock into 4 rows of 4 4×4 blocks each. As described further below, deblock filtering is performed along the edges between pairs of 4×4 blocks.

The filtering process is performed on a macroblock basis, with each macroblock in a frame processed in order of increasing macroblock addresses. Prior to the operation of the deblocking filter process for each macroblock, the deblocked samples of the macroblock or macroblock pair above (if any) and the macroblock or macroblock pair to the left (if any) of the current macroblock are made available. The deblocking filter process is invoked for the luma and chroma components separately. In the 4:2:0 video format, each chroma component has a quarter amount of data as compared to the corresponding luma component. For example, for QCIF of 176×144 pixel values, each frame includes 176×144 Y components, 88×72 Cb components, and 88×72 Cr components. For the H.264/AVC and SVC standards, the deblocking filter is applied to the 4×4 block edges within each 16×16 macroblock in each frame, except for those edges at the boundary of the frame and any edges for which the deblocking filter process is disabled by the disabling flags in the headers.

Deblock filtering is performed for each of the 4×4 blocks for luma and for the corresponding 2×2 blocks for each of the chroma components Cb and Cr. For each macroblock, the vertical edges are filtered first, from left to right, and then the horizontal edges are filtered from top to bottom. The luma deblocking filter process is performed on the four 16-sample vertical edges 401, 403, 405 and 407 and then the four 16-sample horizontal edges 411, 413, 415 and 417, and the deblock filtering process for each chroma component is performed on the two vertical 8-sample edges 401 and 405, and then the two horizontal 8-sample edges 411 and 415. Sample values above and to the left of the current macroblock that may have already been modified by the deblocking filter process operation on previous macroblocks are used as input to the deblocking filter process on the current macroblock and may be further modified during the filtering of the current macroblock. Sample values modified during filtering of vertical edges are used as input for the filtering of the horizontal edges for the same macroblock.

Figure 5:
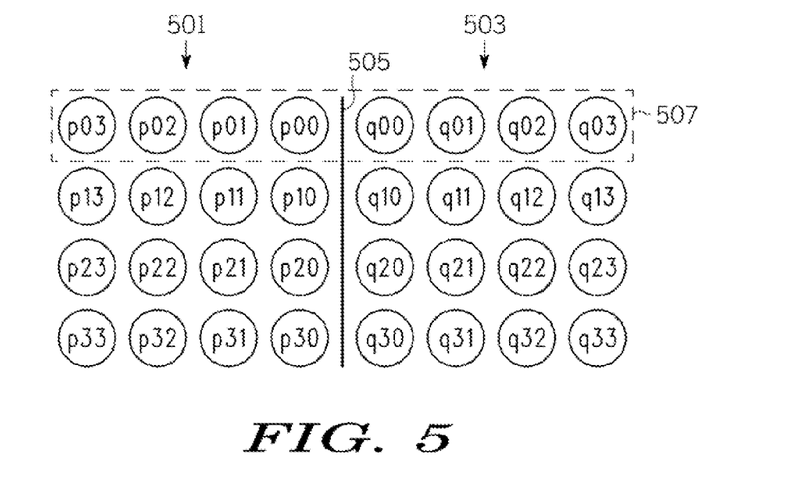
FIG. 5 is a figurative diagram of a pair of 4×4 blocks which are horizontally aligned and separated by a vertical edge to illustrate filtering luma components during vertical edge deblock filtering.

FIG. 5 is a figurative diagram of a pair of 4×4 blocks 501 and 503 which are horizontally aligned and separated by a vertical edge 505 to illustrate filtering luma components during vertical edge deblock filtering. Each component within each of the blocks 501 and 503 is a pixel component represented as a circle labelled according to its relative position, where each label is also used to denote its relative value. The components within the block 501 are labelled with a "p" and the components within the block 503 are labelled with a "q", each followed by a pair of index values indicating its relative position within the matrix of components in each block. As shown, the upper-right component of the block 501 is labelled "p00", the next component to the left along the top row (moving away from the edge 505) is labelled "p01", the next component to the left in the top row is labelled "p02" and the last component in the top row of block 501 is labelled "p03". The components in the second of block 501 are labelled p10-p13, the components in the third row of block 501 are labelled p20-p23, and the components in the last or bottom row of block 501 are labelled p30-p33. The "q" components of the block 503 are labelled in a similar manner in which the index values increase from left to right. The components in the first row of block 503 are labelled q00-q03 (from left to right), the components in the second row of block 503 are labelled q10-q13, the components in the third row of block 503 are labelled q20-q23, and the components in the last or bottom row of block 503 are labelled q30-q33.

Figure 6:
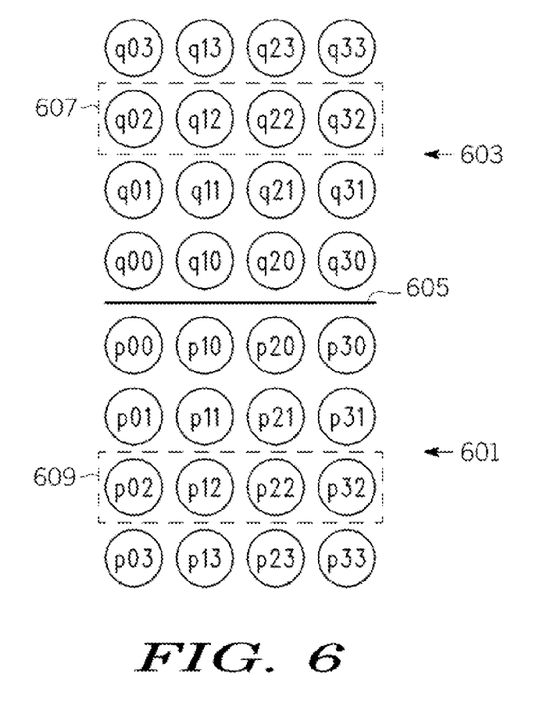
FIG. 6 is a figurative diagram of a pair of 4×4 blocks which are vertically aligned and separated by a horizontal edge to illustrate filtering luma components during horizontal edge deblock filtering.

FIG. 6 is a figurative diagram of a pair of 4×4 blocks 601 and 603 which are vertically aligned and separated by a horizontal edge 605 to illustrate filtering luma components during horizontal edge deblock filtering. The relative orientation and positioning of the components of the blocks 601 and 603 are essentially the same as the blocks 501 and 503, respectively, except that the entire view is rotated counter-clockwise ninety degrees. Thus, when rotated the right block 503 becomes the upper block 603 and the left block 501 becomes the lower block 601, and the vertical edge 505 is rotated to become a horizontal edge 605. The lower-left component of upper block 603 is labelled q00 and the upper left component of lower block 601 is labelled p00, and so on. Each of the Cb and Cr blocks of chroma components are oriented in similar fashion except including only 2×2 chroma components (e.g., p00, p01, p10 and p11; q00, q01, q10 and q11). For example, with reference to the macroblock 400, if the blocks 501 and 503 of FIG. 5 represent blocks 1 and 2, respectively, of FIG. 4, then the vertical edge 505 represents a portion of the vertical edge 403. If the blocks 603 and 601 represent blocks 1 and 5, respectively, then the horizontal edge 605 represents a portion of the horizontal edge 413, and so on.

Figure 7:
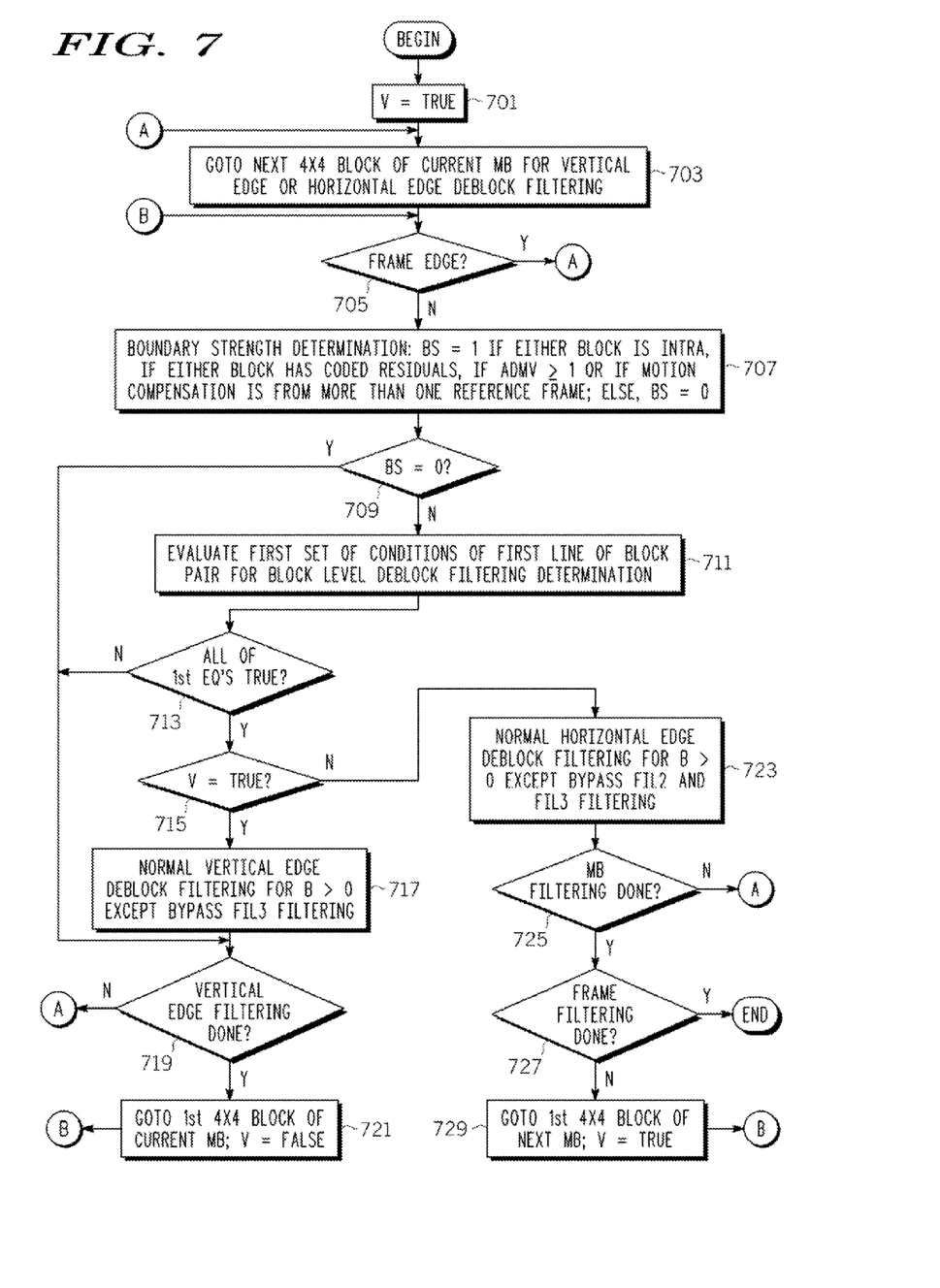
FIG. 7 is a flowchart diagram illustrating operation of the control circuit of the deblocking filter of FIG. 2 (for either or both encoder and decoder) for enhanced layers for both vertical edge and horizontal edge deblock filtering for luma component values for each pair of 4×4 blocks within each macroblock according to an exemplary embodiment.

FIG. 7 is a flowchart diagram illustrating operation of the control circuit 209 of the deblocking filter 201 (for either or both encoder and decoder) for enhanced layers for both vertical edge and horizontal edge deblock filtering for luma component values for each pair of 4×4 blocks within each macroblock according to an exemplary embodiment. Although the deblocking filter process is invoked for luma and chroma components separately, the process for chroma deblock filtering is not explicitly shown since chroma deblock filtering is similar yet simplified as understood by those skilled in the art. Deblock filtering for the base layer remains unmodified, and deblock filtering is not performed if the flags in the header are set to disable deblock filtering for the slice to which the macroblock belongs. Deblock filtering is performed on a macroblock basis with each macroblock of each frame being processed in order of increasing macroblock address. The 4×4 blocks of macroblocks adjacent to the current macroblock (e.g., blocks above or to the left of the current macroblock, if any) are available to perform deblock filtering of the current MB. For each macroblock, vertical edge deblock filtering is performed first, from left to right, along corresponding vertical edges between block pairs, followed by horizontal edge deblock filtering, from top to bottom, along corresponding horizontal edges between block pairs.

At first operation block 701 of FIG. 7, a parameter "V" is set true to denote vertical edge deblock filtering along the vertical edges of the macroblock. At next block 703, operation advances to the "next" (or first) 4×4 block of the current MB in the horizontal or vertical direction depending upon whether performing vertical edge or horizontal edge deblock filtering. It is noted that the upper-left 4×4 block is the first block of the current MB, or block 1 of MB 400. After the first block is processed, the next block depends on whether filtering is being performed along vertical or horizontal edges. For example, with reference to the MB 400, during vertical edge filtering, operation advances down the left edge 401 from block 1 to block 5, then to block 9, and then to block 13, and then up to block 2 in the next column to begin deblock filtering along the next vertical edge 403. Deblock filtering continues down the next vertical edge 403 from block 2 to block 6, then to block 10, then to block 14, and then back up to block 3 to begin deblock filtering along the next vertical edge 405, and so on to complete filtering for the vertical edges 401, 403, 405 and 407. The operative vertical edge for each current 4×4 block during vertical edge filtering is its left vertical edge. Since deblock filtering occurs between a pair of 4×4 blocks, the other 4×4 block of each block pair depends on the operative edge. For example, if the current 4×4 block is block 2 of macroblock 400 during vertical edge deblock filtering, then the other 4×4 block of the block pair is block 1.

After vertical edge deblock filtering is completed, operation advances back to block 1 to begin horizontal edge deblock filtering. During horizontal edge deblock filtering, operation advances along horizontal edge 411 from block 1 to block 2, then to block 3, and then to block 4, and then to back block 5 in the next row to begin filtering along the next horizontal edge 413, and so on. The operative horizontal edge for each 4×4 block during horizontal edge filtering is its top horizontal edge. Again, since deblock filtering occurs between a pair of 4×4 blocks, the other 4×4 block of each block pair is selected based on the operative edge. For example, if the current 4×4 block is block 5 during horizontal edge deblock filtering, then the other 4×4 block of the block pair is block 1.

At next block 705, it is queried whether the operative edge is a frame edge. If so, operation loops back to block 703 to advance to the next block in the filtering process. The first MB for each frame is the upper-left MB in which the operative edge is the left vertical edge of the frame. If the operative edge is a frame edge, deblock filtering is not performed. Thus, for the very first macroblock of the frame in which the left vertical edge is a frame edge, deblock filtering is not performed. For example, if macroblock 400 represents the first macroblock of the frame in which the first vertical edge 401 is the frame edge, then deblock filtering is bypassed for blocks 1, 5, 9 and 13 and begins for block 2 along the next vertical edge 403. The same is true for each 4×4 block along the left-side of each macroblock along the left edge of the frame. During horizontal edge filtering, the operative edge of each upper 4×4 block of each macroblock along the top edge of the frame is a frame edge, so that deblock filtering is bypassed.

If the operative edge is not a frame edge, operation proceeds to block 707 to determine the boundary strength (BS) value for the operative block pair, where the BS value is determined by the BS circuit 208. The operative block pair includes the current block and the adjacent 4×4 block to the left during vertical edge filtering, or the adjacent 4×4 block above the current 4×4 block during horizontal edge filtering. The BS determination in block 707 for each enhanced layer is simplified as compared to the conventional BS determination applied to all layers. In the conventional BS determination, which is still performed for each base layer, the BS value is 4 if either block of the block pair is encoded in intra mode and if the edge between the blocks is a macroblock edge as further explained below. As previously described, each MB is encoded in intra mode in which a prediction block is formed based on reconstructed information in the current frame, or is encoded in inter mode in which a prediction block is formed based on the information of reference frames. With reference to FIGS. 4, 5 and 6, if the vertical edge 505 represents a portion of any of the outer edges 401 or 409 or if the horizontal edge 605 represents any portion of the outer edges 411 or 419, such that the 4×4 blocks 501 and 503 or 601 and 603 are within different macroblocks, then the edge between the block pair is a macroblock edge. In the conventional deblock filtering configuration, if either block of the block pair is encoded in intra mode and the edge is not a macroblock edge, then the BS value is 3. If the conditions for BS of 4 or 3 are not true and if either 4×4 block of the block pair has a coded residual, then BS=2. If the conditions for BS of 2-4 are not true and the absolute difference of the two motion vector components (two MVx, or two MVy) of the 4×4 block pair is greater than or equal to one or if motion compensation is from at least two different reference frames, then BS=1. If none of these conditions is true in the conventional case, then BS=0.

In the conventional configuration, if BS=0, then deblock filtering is not performed for the block pair. Otherwise, filtering is performed along the operative edge from left to right for vertical edge filtering or from top to bottom for horizontal edge filtering. For example, if BS is equal to 1, 2 or 3 in the conventional configuration, then a first set of conditions is evaluated based on component values p00, p01, q00 and q01 to determine whether to employ the first filter FIL1 203 to filter the component values p00 and q00. If the first set of conditions is true, then before modifying the edge component values p00 and q00, a second set of conditions is evaluated based on component values p02, p00, q02 and q00 to determine whether to employ the second filter FIL2 205 to filter the next pair of component values p01 and q01. If the second set of conditions is also true, then the second filter FIL2 205 is applied first to filter the component values p01 and q01 and additional parameter(s) (e.g., clipping values) are modified for the first set of conditions as known to those of ordinary skill in the art. After filtering using the second filter FIL2 205, the first filter FIL1 203 is applied to filter the component values p00 and q00. The entire deblock filtering process is repeated for the next set of component values p10, p11, p12 and q10, q11 and q12, and then again for the next set of component values p20, p21, p22 and q20, q21 and q22, and then for the last set of component values p30, p31, p32 and q30, q31 and q32 moving along the applicable operative edge for both vertical edge and horizontal edge deblock filtering.

In the conventional configuration, if instead the BS value is 4, then a third set of conditions are checked to determine the extent to which deblock filtering is to be performed using the third filters 207. In the conventional configuration, a BS value of 4 is the maximum boundary strength for the base layer and each of the enhanced layers. In one embodiment, the third filters 207 include a strong filter (e.g., 4 or 5 tap filter) and a relatively weak filter (e.g., 3-tap filter). The weaker filter is used for chroma deblock filtering to modify only the edge chroma values p00-p10 and q00-q10. If any of the third set of conditions is false, then the weaker filter is also used to modify only the edge luma component values p00-p30 and q00-q30 (e.g., only the component values adjacent to the operative edge). For BS=4, if each of the third set of conditions are true and if deblock filtering is enabled in the conventional configuration, all three luma component values of each line (p00-p02 and q00-q02, p11-p12 and q10-q12, p20-p22 and q20-q22, and p30-p32 and q30-q32) are filtered first using the strong filter 207 moving along the operative edge (e.g., 505 or 605).

At block 707, the BS determination is substantially simplified so that the BS determination for filtering using the third filters 207, or BS=4, is bypassed entirely. In this manner, determination of the third set of conditions is avoided and filtering employing the third filters 207 is avoided thereby simplifying coding complexity. Furthermore, the BS determination is simplified to only one of two values, 0 or 1, for all cases. At block 707, BS=1 if either 4×4 block of the block pair is coded in intra, or if either 4×4 block has coded residuals, or if the absolute difference of the pair of MVs for the 4×4 block pair (ADMV) is greater than or equal to 1, or if motion compensation is determined using more than one reference frame. Otherwise BS=0. The BS values determined for the luma components are copied for the corresponding chroma components so that BS values for the chroma values are not calculated independently. If BS=0 as determined at next block 709, then deblock filtering is not performed for the current block pair and operation jumps to block 719 described further below. If BS is not zero, operation advances instead to block 711 to evaluate the first set of conditions of the first line of the current 4×4 block for a block level deblock filtering determination. The first set of conditions is determined according to the following equations (1), (2) and (3):

$$|p00-q00| < \alpha(\text{Index}A) - O_{AL} \quad (1)$$

$$|p01-p00| < \beta(\text{Index}B) - O_{BL} \quad (2)$$

$$|q01-q00| < \beta(\text{Index}B) - O_{BL} \quad (3)$$

where $O_{AL}$ and $O_{BL}$ are the alpha and beta offsets, respectively, for luma information, if provided within the sequence such as within the sequence header 303 as previously described, and where $\alpha(x)$ and $\beta(x)$ are approximated according to the following equations (4) and (5), respectively:

$$\alpha(x) = 0.8\left(2^{\frac{x}{6}} - 1\right) \quad (4)$$

$$\beta(x) = 0.5x - 7 \quad (5)$$

In general, the beta value $\beta(x)$ is considerably smaller than the alpha value $\alpha(x)$. The IndexA and IndexB values are determined according to the following equations (6) and (7), respectively:

$$\text{Index}A = \text{MIN}(\text{MAX}(0, QP+AO), 51) \quad (6)$$

$$\text{Index}B = \text{MIN}(\text{MAX}(0, QP+BO), 51) \quad (7)$$

where MIN and MAX are the minimum and maximum functions, respectively, where QP is the quantization parameter, and where AO and BO are the alpha and beta offset parameters, respectively, provided within the corresponding slice header 317 for the corresponding enhanced layer.

The IndexA value is determined by adding the AO offset from the slice header to the current QP value, comparing to 0 and taking the maximum value as described by equation (6). The QP value has a range of 0 to 51. The AO and BO offsets each have a range −6 to +6, so that the QP value is adjusted accordingly and then compared with 0. The maximum of 0 and the adjusted QP value is then compared with the value 51, and the lower or minimum value is used to determine IndexA. In this manner, the range of IndexA is 0 to 51. In one embodiment, the resulting IndexA value is plugged into equation (4) to determine the alpha value for $\alpha(\text{Index}A)$. Alternatively, the IndexA value is used as an index into a lookup table (not shown) or the like, which lists the possible values of $\alpha$ for the range of IndexA values. The $O_{AL}$ value, if provided, is subtracted from the $\alpha(\text{Index}A)$ value and compared with the absolute value of the difference between the luma component values p00 and q00 in accordance with equation (1). Equations (2) and (3) are evaluated in similar fashion except using the IndexB value in accordance with equation (7) (using the beta offset value BO) and using the $\beta(x)$ equation (5) or corresponding lookup table and using the $O_{BL}$ value, if provided. The three equations (1), (2) and (3) use the luma component values p00, p01, q00 and q01 along the top line of component values the block pair for vertical edge filtering or along the left line of component values the block pair for horizontal edge filtering.

At block 711, the three equations (1), (2) and (3) are evaluated and determined to be true or false. If any one of the equations (1), (2) or (3) is false as determined at next block 713, then operation jumps to block 719 to bypass deblock filtering for that block pair. In other words, the deblock filtering determination for each block pair is "block-based" rather than "component-based" as determined for the base layer or as determined for the enhanced layers in conventional configurations. If all three equations (1), (2) and (3) are true as determined at block 713, then operation proceeds instead to block 715 to query whether the V parameter is true or false to determine whether the deblocking filter 201 is performing vertical edge or horizontal edge deblock filtering. If V is true at block 715, then vertical edge deblock filtering is being performed and operation proceeds to block 717 to perform vertical edge deblock filtering along the operative vertical edge in a similar manner as conducted for conventional configurations. At block 717, deblock filtering is performed along the entire operable vertical edge between the block pair using the first and second filters FIL1 203 and FIL2 205 in a similar manner as conventional configurations. In this case, the second set of equations (not shown) is evaluated to determine whether to filter the p01 and q01 component values. If each of the second set of equations is true, then the p01 and q01 component values are modified first using the second filter FIL2 205 and then the component values p00 and q00 are filtered using the first filter FIL1 203. Operation then advances to determine filtering for the second set of component values p10, p11, q10 and q11 in a similar manner using similar equations (1)-(7) as described above except substituting the p1x and q1x values. Operation then advances in similar manner for the third and fourth sets of component values. In general, deblock filtering performed at block 717 for B=1 is substantially the same as in conventional configurations for B=1-3. It is appreciated, however, that determination of the third set of conditions and filtering using the third filters 207 are bypassed and not performed for each of the enhanced layers. The chroma component values p00, and q00 are filtered in similar manner as for conventional configurations using a modified clipping value as understood by those of ordinary skill in the art except that the corresponding filter of the third filters FIL3 207 is bypassed and instead the filter FIL2 205 is used.

After vertical edge deblock filtering is performed for the block pair at block 717, or if deblock filtering is bypassed as determined at either block 709 or 713, operation proceeds to block 719 to query whether vertical edge deblock filtering is completed for the current macroblock. If not, operation returns to block 703 to advance to the next 4×4 block of the current macroblock along the vertical edges (e.g., 1, 5, 9, 13, then 2, 6, 10, 14, then 3, 7, 11, 15 and then 4, 8, 12, 16). Operation loops between blocks 703-719 until vertical edge deblock filtering of the current macroblock is completed. When vertical edge deblock filtering is completed as determined at block 719, operation proceeds to block 721 to return back to the first 4×4 block of the current MB and the V parameter is set to false. In this manner, horizontal edge filtering along the horizontal edges is initiated for the current MB. Operation then loops back to block 705 to query whether the operative edge is a frame edge. If so, operation loops back to block 703 to advance to the next 4×4 block of the current MB. If the edge is not a frame edge, operation proceeds to block 707 to perform the BS determination in a similar manner as previously described. Operation of blocks 703-713 is substantially the same for horiztonal edge deblock filtering as described for vertical edge deblock filtering. For horiztonal edge filtering, however, when operation advances to block 715, since the V parameter is now false, operation proceeds instead to block 723 rather than block 717. At block 723, horizontal edge deblock filtering along the operative horizontal edge is performed in a similar manner as that described above for deblock filtering along the operative vertical edge, except that evaluation of the second conditions is not performed so that the second filter FIL2 205 is not used. And further, evaluation of the third conditions is not performed and the third filters FIL3 207 are not used. In this manner, for horizontal edge deblock filtering, only the first filter FIL1 203 is applied to filter the p0 and q0 values so that filtering operation is substantially simplified.

The bypassing of the additional deblock filtering along the horizontal edges provides a substantial advantage in that memory read accesses to memory (e.g., 106 or 108) are substantially reduced. As is appreciated by those of ordinary skill in the art, reading the component values in the horizontal direction (during vertical edge deblock filtering) is significantly more efficient than reading the component values in the vertical direction (during horizontal edge deblock filtering). With reference to FIG. 5, the entire top row of component values 507 are typically read from memory together in one or two read operations. In one embodiment, for example, the component values p00-p03 and q00-q03 are read in one or two read accesses from memory. In this manner, the component values p02 and q02 are available to evaluate the second set of equations for modifying the component values p00 and q01 during vertical edge filtering along the vertical edge 505. With reference to FIG. 6, the component values q02 and p02 are located in different rows and component values 607 and 609 are further located in a different memory page. At least two non-sequential memory read accesses are typically used to read the two different rows of pixel values 607 and 609 in order to access the component values q02 and p02 used for evaluating the second set of equations. The bypassing of the additional filtering along the horizontal edge 605 eliminates the non-sequential memory read accesses and thus significantly reduces overall memory read accesses.

It is further noted that bypassing the additional deblock filtering along the operative horizontal edge results in only a slight degradation in objective and subjective visual quality as compared to conventional deblock filtering since motion in the horizontal direction is typically greater than motion in the vertical direction. The larger motions in the horizontal direction causes greater block effects along the vertical boundaries or edges as compared to the horizontal boundaries or edges. In this manner, deblock filtering along vertical edges provides a greater visual impact as compared to deblock filtering along the horizontal edges.

After horizontal deblock filtering along the operative horizontal edge is performed at block 723, operation proceeds to block 725 to query whether deblock filtering for the current MB is completed. If not, operation loops back to block 703 to advance to the next 4×4 block of the current MB to continue horizontal edge deblock filtering. As previously described for horizontal edge deblock filtering and with reference to the MB 400, operation advances in the following 4×4 block order: 1-4, and then 5-8, and then 9-12, and then 13-16. Operation loops between blocks 703 to 725 for each block of the current MB for horizontal edge deblock filtering. When deblock filtering is completed for the current MB as determined at block 725, operation proceeds to block 727 to query whether deblock filtering is completed for the current frame. If so, operation is completed for the frame. If not, operation proceeds to block 729 to advance to the first block of the next macroblock of the current frame and to reset V back to true. Operation then loops back to block 705 to begin vertical edge filtering for the first 4×4 block of the next MB of the current frame.

A method of simplifying deblock filtering of video blocks of an enhanced layer of scalable video information according to one embodiment includes selecting an adjacent pair of video blocks having lines of component values aligned on either side of an intermediate edge, determining whether boundary strength of the adjacent pair of video blocks is a first value, evaluating a first plurality of conditions using component values of a first line of the lines if the boundary strength is not the first value, and bypassing deblock filtering between the adjacent pair of video blocks along the intermediate edge if the boundary strength is the first value or if any of the first plurality of conditions is false.

The evaluating a first plurality of conditions may include subtracting an alpha offset from an alpha value to provide an adjusted alpha value, subtracting a beta offset from a beta value to provide an adjusted beta value, comparing the adjusted alpha value with a first component difference, and comparing the adjusted beta value with a second component difference. The method may include incorporating the alpha offset and the beta offset in a scalable video information bitstream, or receiving the alpha offset and the beta offset from a scalable video information bitstream.

The method may include bypassing evaluating a second plurality of conditions along the horizontal edge and bypassing deblock filtering of component values associated with the second plurality of conditions if the boundary strength is not the first value, if each of the first plurality of conditions is true, and if the intermediate edge is a horizontal edge. The method may include bypassing reading from memory component values used for the second plurality of conditions.

The determining whether boundary strength of the adjacent pair of video blocks is a first value may include performing a simplified boundary strength determination in which boundary strength is only one of two values including first and second values. The performing a simplified boundary strength determination may include determining that the boundary strength is the second value if either block is intra coded, or if either block has coded residuals, or if a motion vector is less than one, or if more than one reference frame is used for motion compensation, and otherwise determining that the boundary strength is the first value. The method may include bypassing determination of conditions and bypassing deblock filtering associated with a maximum boundary strength that is greater than either one of the first and second values.

A video system according to an embodiment includes a video coding device and a deblocking filter. The video coding device processes scalable video information and provides video blocks each having multiple lines of component values. The deblocking filter deblocking filter filters video blocks of an enhanced layer of the scalable video information along intermediate edges between pairs of the video blocks and includes a boundary strength circuit and a control circuit. The boundary strength circuit determines whether boundary strength of an adjacent pair of the video blocks aligned on either side of an intermediate edge is a first value. The control circuit bypasses evaluation of a first plurality of conditions and bypasses deblock filtering between the adjacent pair of video blocks along the intermediate edge if the boundary strength is the first value. The control circuit evaluates the first plurality of conditions using component values of a first line of component values of the adjacent pair of video blocks if the boundary strength is not the first value. The control circuit bypasses deblock filtering between the adjacent pair of video blocks along the intermediate edge if the boundary strength is the first value or if any of the first plurality of conditions using the component values of the first line is false.

In one embodiment, the control circuit subtracts an alpha offset from an alpha value to provide an adjusted alpha value, subtracts a beta offset from a beta value to provide an adjusted beta value, compares the adjusted alpha value with a first component difference and compares the adjusted beta value with a second component difference when evaluating the first plurality of conditions. The video coding device may be a video encoder which incorporates the alpha offset and the beta offset into an output bitstream, or a video decoder which receives the alpha offset and the beta offset from an input bitstream.

The control circuit may bypass evaluating a second plurality of conditions along the intermediate edge and may bypass deblock filtering of component values associated with the second plurality of conditions if the intermediate edge is a horizontal edge. The video system may include a memory which stores the scalable video information, where the control circuit bypasses reading of component values used for the second plurality of conditions from the memory if the intermediate edge is a horizontal edge. The boundary strength circuit may perform a simplified boundary strength determination by determining that boundary strength is only one of two values including the first value and a second value. The control circuit may bypass determination of conditions and deblock filtering associated with a maximum boundary strength which is greater than either one of the first and second values.

A deblocking filter according to one embodiment includes a first filter, a boundary strength circuit, and a control circuit. The first filter is configured to filter component values of an adjacent pair of video blocks of scalable video information including lines of component values aligned on either side of an intermediate edge based on a first set of conditions. The boundary strength circuit determines whether boundary strength of the adjacent pair of video blocks is a first value. The control circuit bypasses evaluation of the first set of conditions and bypasses filtering using the first filter if the boundary strength is the first value and the adjacent pair of video blocks is in an enhanced layer. The control circuit bypasses filtering using the first filter if any of the first set of conditions is false using component values of a first line of component values and if the adjacent pair of video blocks is in an enhanced layer.

The deblocking filter may include a second filter configured to filter the component values of the adjacent pair of video blocks based on a second set of conditions. In this case, the control circuit bypasses evaluation of the second set of conditions and bypasses filtering using the second filter if the intermediate edge is a horizontal edge and if the adjacent pair of video blocks are in an enhanced layer. The deblocking filter may further include a third filter configured to filter the component values of the adjacent pair of video blocks based on a third set of conditions. In this case, control circuit bypasses evaluation of the third set of conditions and bypasses filtering using the third filter if the adjacent pair of video blocks is in an enhanced layer.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Also, although the present invention has been described herein with respect to video information, it is appreciated that the present invention applies more generally to any "image information", such as video (e.g. MPEG and the like), and image, or image sequencing, such as, for example, JPEG, MJPEG, JPEG2000, MJPEG2000, etc. The term "image information" as used herein is intended to apply to any video or image or image sequence information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of simplifying deblock filtering of video blocks of an enhanced layer of scalable video information, comprising:
    selecting an adjacent pair of video blocks having a plurality of lines of component values aligned on either side of an intermediate edge;
    determining whether boundary strength of the adjacent pair of video blocks is a first value;
    if the boundary strength is not the first value, evaluating a first plurality of conditions using component values of only a first line of the plurality of lines; and
    bypassing deblock filtering between the adjacent pair of video blocks along the intermediate edge if the boundary strength is the first value or if any of the first plurality of conditions is false.

2. The method of claim 1, wherein said evaluating a first plurality of conditions comprises:
    subtracting an alpha offset from an alpha value to provide an adjusted alpha value;
    subtracting a beta offset from a beta value to provide an adjusted beta value;
    comparing the adjusted alpha value with a first component difference; and
    comparing the adjusted beta value with a second component difference.

3. The method of claim 2, further comprising incorporating the alpha offset and the beta offset in a scalable video information bitstream.

4. The method of claim 2, further comprising receiving the alpha offset and the beta offset from a scalable video information bitstream.

5. The method of claim 1, wherein if the boundary strength is not the first value, wherein if each of the first plurality of conditions is true, and wherein if the intermediate edge is a horizontal edge, further comprising:
    bypassing evaluating a second plurality of conditions along the horizontal edge; and
    bypassing deblock filtering of component values associated with the second plurality of conditions.

6. The method of claim 5, further comprising bypassing reading from memory component values used for the second plurality of conditions.

7. The method of claim 1, wherein said determining whether boundary strength of the adjacent pair of video blocks is a first value comprises performing a simplified boundary strength determination in which boundary strength is only one of two values including a first value and a second value.

8. The method of claim 7, wherein said performing a simplified boundary strength determination comprises determining that the boundary strength is the second value if either block is intra coded, or if either block has coded residuals, or if the absolute difference of motion vector components of the block pair is greater than one, or if more than one reference frame is used for motion compensation, and otherwise determining that the boundary strength is the first value.

9. The method of claim 1, further comprising bypassing evaluation of conditions and bypassing deblock filtering associated with a maximum boundary strength that is further associated with a base layer.

10. A video system, comprising:
a video coding device for processing scalable video information, said video coding device providing video blocks each having a plurality of lines of component values; and
a deblocking filter, coupled to said video coding device, which filters video blocks of an enhanced layer of said scalable video information along intermediate edges between pairs of said video blocks, said deblocking filter comprising:
a boundary strength circuit which determines whether boundary strength of an adjacent pair of said video blocks aligned on either side of an intermediate edge is a first value; and
a control circuit which bypasses evaluation of a first plurality of conditions and which bypasses deblock filtering between said adjacent pair of video blocks along said intermediate edge if said boundary strength is said first value, which evaluates said first plurality of conditions using component values of only a first line of a plurality of lines of said adjacent pair of video blocks if said boundary strength is not said first value, and which bypasses deblock filtering between said adjacent pair of video blocks along said intermediate edge if said boundary strength is said first value or if any of said first plurality of conditions using said component values of said first line is false.

11. The video system of claim 10, wherein said control circuit subtracts an alpha offset from an alpha value to provide an adjusted alpha value, subtracts a beta offset from a beta value to provide an adjusted beta value, compares said adjusted alpha value with a first component difference and compares said adjusted beta value with a second component difference when evaluating said first plurality of conditions.

12. The video system of claim 11, wherein said video coding device comprises a video encoder which incorporates said alpha offset and said beta offset into an output bitstream.

13. The video system of claim 11, wherein said video coding device comprises a video decoder which receives said alpha offset and said beta offset from an input bitstream.

14. The video system of claim 10, wherein said control circuit bypasses evaluating a second plurality of conditions along said intermediate edge and bypasses deblock filtering of component values associated with said second plurality of conditions if said intermediate edge comprises a horizontal edge.

15. The video system of claim 14, further comprising a memory, coupled to said deblocking filter, which stores said scalable video information, wherein said control circuit further bypasses reading of component values used for said second plurality of conditions from said memory if said intermediate edge comprises a horizontal edge.

16. The video system of claim 10, wherein said boundary strength circuit performs a simplified boundary strength determination including determining that boundary strength is only one of two values including said first value and a second value.

17. The video system of claim 10, wherein said control circuit bypasses determination of conditions and deblock filtering associated with a maximum boundary strength which is further associated with a base layer.

18. A deblocking filter, comprising:
a first filter configured to filter component values of an adjacent pair of video blocks of scalable video information including a plurality of lines of said component values aligned on either side of an intermediate edge based on a first set of conditions;
a boundary strength circuit which determines whether boundary strength of said adjacent pair of video blocks is a first value; and
a control circuit, coupled to said first filter and said boundary strength circuit, which bypasses evaluation of said first set of conditions and filtering using said first filter if said boundary strength is said first value and said adjacent pair of video blocks is in an enhanced layer, and which bypasses filtering using said first filter if any of said first set of conditions is false using component values of only a first line of said plurality of lines and said adjacent pair of video blocks is in an enhanced layer.

19. The deblocking filter of claim 18, further comprising:
a second filter, coupled to said control circuit, configured to filter said component values of said adjacent pair of video blocks based on a second set of conditions; and
wherein said control circuit bypasses evaluation of said second set of conditions and bypasses filtering using said second filter if said intermediate edge is a horizontal edge and said adjacent pair of video blocks are in an enhanced layer.

20. The deblocking filter of claim 19, further comprising:
a third filter, coupled to said control circuit, configured to filter said component values of said adjacent pair of video blocks based on a third set of conditions; and
wherein said control circuit bypasses evaluation of said third set of conditions and bypasses filtering using said third filter if said adjacent pair of video blocks are in an enhanced layer.

* * * * *